(12) United States Patent
Eichholz

(10) Patent No.: US 10,349,812 B2
(45) Date of Patent: *Jul. 16, 2019

(54) MISTING CHAMBER

(71) Applicant: SANHUA AWECO Appliance Systems GmbH, Neukirch (DE)

(72) Inventor: Heinz-Dieter Eichholz, Iserlohn (DE)

(73) Assignee: SANHUA AWECO Appliance Systems GmbH, Neukirch (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/603,358

(22) Filed: May 23, 2017

(65) Prior Publication Data

US 2017/0258293 A1    Sep. 14, 2017

Related U.S. Application Data

(63) Continuation of application No. 14/446,197, filed on Jul. 29, 2014, now Pat. No. 9,671,791.

(30) Foreign Application Priority Data

Jul. 30, 2013    (DE) .................. 10 2013 012 572

(51) Int. Cl.
*A47L 15/48*    (2006.01)
*B01D 47/06*    (2006.01)

(52) U.S. Cl.
CPC .......... *A47L 15/486* (2013.01); *A47L 15/481* (2013.01); *B01D 47/06* (2013.01); *B01D 2221/02* (2013.01)

(58) Field of Classification Search
CPC .................................................. A47L 15/481
See application file for complete search history.

(56) References Cited

U.S. PATENT DOCUMENTS 2,843,943 A    7/1958   Geldhof et al.

FOREIGN PATENT DOCUMENTS

| DE | 10 2010 047 058 A1 | 4/2011 |
|---|---|---|
| DE | 10 2011 117 734 A1 | 2/2013 |
| EP | 1 500 739 A1 | 1/2005 |
| EP | 1 983 091 A1 | 10/2008 |
| WO | WO 02/03002 | 1/2002 |
| WO | WO 2004/056448 A2 | 7/2004 |

*Primary Examiner* — Jason Y Ko
(74) *Attorney, Agent, or Firm* — Breneman & Georges

(57) ABSTRACT

The invention proposes a domestic appliance having a drying apparatus, such as a dishwasher, a tumble dryer, a washing machine or the like, wherein the drying apparatus (8) has a contact space (8, 14) for establishing contact between drying air which originates from a working space (11) in the domestic appliance and a hygroscopic liquid (4) which is provided for drying purposes, in which domestic appliance effective drying is possible in a comparatively short time. According to the invention, this is achieved in that at least one nozzle (15, 16) for atomizing the hygroscopic liquid (4) in the contact chamber (8, 14) and/or for sprinkling the hygroscopic liquid (4) in the contact chamber (8, 14) is provided.

13 Claims, 1 Drawing Sheet

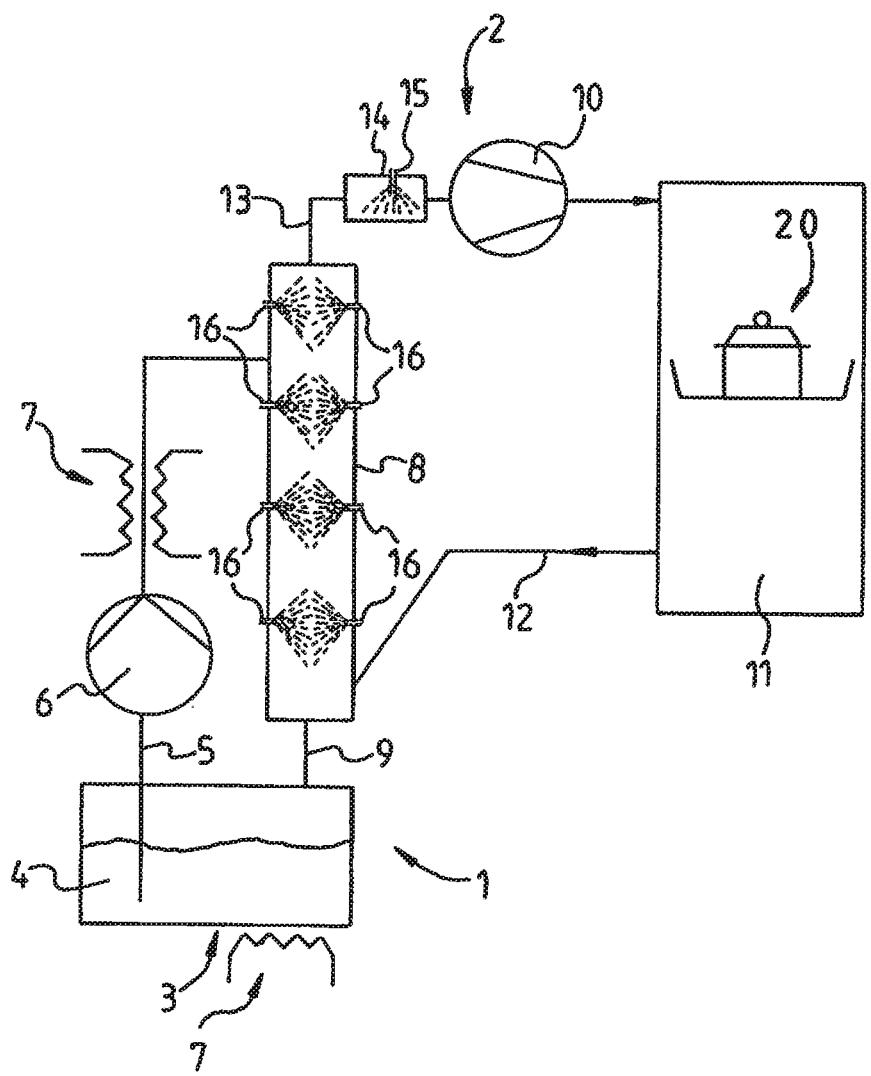

MISTING CHAMBER

CROSS REFERENCE TO RELATED APPLICATION(S)

This application is a continuation of U.S. application Ser. No. 14/446,197 filed Jul. 29, 2014 now U.S. Pat. No. 9,681,791.

The invention relates to a domestic appliance having a drying apparatus, such as a dishwasher, a tumble dryer, a washing machine or the like, according to the preamble of claim 1.

A domestic appliance of this kind has been described, for example, in documents 10 2010 047 058 A1 and DE 10 2011 117 734 A1.

One problem in producing a domestic appliance or drying apparatus of this kind is firstly that of providing a large contact surface area between the hygroscopic liquid and the air which is to be dried, and secondly of recollecting the hygroscopic liquid after the liquid has been extracted from the air, and supplying said liquid to a storage depot.

The liquid which increases the surface area leads to ever smaller droplets which can ultimately form an aerosol. The smaller the liquid droplets, the more problematic it is to separate off said liquid from the dried air.

The object of the invention is therefore to propose an apparatus according to the preamble of claim 1 in which effective drying is possible in a comparatively short time.

According to the invention, this is achieved by the characterizing features of claim 1. Advantageous embodiments and developments of the invention are possible by virtue of the measures cited in the dependent claims.

A domestic appliance according to the invention is accordingly distinguished in that at least one nozzle for atomizing the hygroscopic liquid in the contact chamber and/or for sprinkling the hygroscopic liquid in the contact chamber is provided.

The hygroscopic liquid can be distributed particularly finely without a great deal of outlay with the aid of the nozzle or nozzles according to the invention, and therefore a very large active surface area is generated. By way of example, the hygroscopic liquid can be in the form of drizzle and/or mist or as vapor in the contact space. This results in particularly effective drying of the drying air, which is to be dried, in a relatively short time.

In one advantageous variant of the invention, a pressure-generating unit or pump for applying pressure to the hygroscopic liquid is provided. The hygroscopic liquid in the contact chamber can be atomized or nebulized in a particularly effective manner by pressure advantageously being applied to the hygroscopic liquid or by the advantageous excess pressure. By way of example, a pump for pumping the dishwashing/cleaning medium or water is used for this purpose. The structural and financial outlay can be reduced owing to this dual use of a component which is already present.

The atomized hygroscopic liquid or the generated drizzle and/or mist advantageously fills substantially the entire volume of the contact space. A plurality of nozzles which are, in particular, distributed in the contact space or spaced apart from one another are preferably provided. This results in an advantageous distribution or spacing of the nozzles in the contact space, and therefore the atomized hygroscopic liquid or the drizzle and/or the mist is distributed in a uniform manner and/or as completely as possible. This improves the utilization of the contact space and therefore leads to particularly effective and rapid drying.

In one advantageous embodiment of the invention, at least one nozzle or mobile nozzles are provided. As a result, it is also possible to advantageously distribute the hygroscopic liquid in the contact space or in the drying air stream using a single nozzle and particularly using a plurality of mobile nozzles.

At least one or more mobile arms with nozzles are advantageously provided. It is possible to advantageously distribute the hygroscopic liquid in the contact space as a result of this too.

In particular developments of the invention, at least one rotatable nozzle and/or at least one fan-type nozzle are provided. A mobile nozzle can be implemented without a great deal of outlay with the aid of a rotatable arm.

A fan-type nozzle advantageously generates a fan-shaped jet, wherein, as viewed in cross section which is oriented transverse to the direction of emission, the width of said fan-shaped jet is greater than, in particular several times greater than, the depth of said fan-shaped jet. A rotatable fan-shaped jet, which preferably rotates about its central axis, allows advantageous mixing, possibly eddying, with the drying air which is to be dried.

The spraying direction of at least one spray nozzle which is provided for atomizing the hygroscopic liquid is advantageously directed opposite to the direction of flow of the drying air. Particularly effective thorough mixing of the atomized hygroscopic liquid or of the drizzle and/or stream of mist with the drying air which is to be dried is achieved by way of this measure. An additional result is that undiluted hygroscopic liquid comes into contact with drying air which has already dried to a certain extent and, on account of water which has already been absorbed from the drying air, somewhat diluted hygroscopic liquid comes into contact with relatively moist drying air. A particularly high degree of efficiency of the drying process can be realized as a result.

The spraying direction is preferably oriented transverse to the direction of flow of the drying air at an angle of between 90° and 180° in relation to the direction of flow of the drying air. This ensures advantageous mixing of the atomized hygroscopic liquid with the drying air which is to be dried.

In one advantageous variant of the invention, a plurality of contact chambers and/or contact chamber regions/zones are provided. As a result, separate or optimum drying conditions given different drying parameters or drying processes can be provided in each contact chamber. By way of example, preliminary drying can be provided in a first contact chamber and/or main drying can be provided in a second contact chamber and/or subsequent drying can be provided in a third contact chamber and/or a sprinkling chamber and/or a misting chamber can be provided. Provision can also be made for the contact chambers to be advantageously matched to different cleaning and/or washing or dishwashing cycles of the domestic appliance.

Different nozzles for producing different droplet sizes are preferably provided. For example, different nozzles for producing droplets of different sizes can be provided in separate or adjacent regions/zones of a common contact chamber or are each provided separately in different contact chambers. Nozzles for producing different droplet sizes are preferably accommodated in different contact spaces. By way of example, at least one first nozzle can generate sprinkling or relatively large drops, and at least one second nozzle can generate a mist with relatively small droplets. As a result, it is possible to adjust the drying process, possibly as a function of different drying parameters, for example with a high or relatively low level of vapor in the drying air which is to be dried.

A sprinkling chamber for sprinkling the aerosol with hygroscopic fluid is advantageously provided as a separation space for separating off atomized droplets from the drying air, wherein the sprinkling chamber is provided downstream of an atomizing chamber in the air flow. As a result, the hygroscopic liquid can be advantageously removed or separated off from the drying air stream. Therefore, the hygroscopic liquid can advantageously be filtered out of the air stream by means of sprinkling.

One exemplary embodiment of the invention is illustrated in the drawing and will be explained in greater detail below with reference to the single FIGURE.

FIG. 1 shows a schematic design of the drying apparatus of a domestic appliance according to the invention.

FIG. 1 shows a primary circuit 1 and also a secondary circuit 2 for a dishwasher. The primary circuit 1 comprises a hygroscopic liquid, for example a lithium chloride solution. The secondary circuit 2 constitutes an air circuit containing drying air which is to be dried and/or the air stream.

In this case, the primary circuit 1 comprises a container 3, for example containing a lithium chloride solution 4. The lithium chloride solution 4 can be drawn away via a line 5 by means of a pump 6 which is designed as a circulation pump. The solution is heated by a heater 7, as a result of which moisture can escape and therefore the concentration of the extraction medium, specifically lithium chloride solution 4, can increase. Without being explained further, the heater 7 can, as an alternative or in combination with the illustrated variant, also be arranged in/on the container 3 for the purpose of heating the solution 4.

The electrolyte solution 4 finally enters a contact chamber 8 in which the primary circuit 1 is connected to the secondary circuit 2. Therefore, the hygroscopic liquid, for example lithium chloride solution, comes into contact with the air which is to be dried, in the contact chamber 8.

The secondary circuit 2 blows the drying air into the working space 11 of the dishwasher by means of a fan 10, said drying air drying wet dishes 20 in a dish rack in said working space. The drying air is drawn out of the working space 11 within the secondary circuit 2 by the flow drive of the fan 10 via the line 12, and enters the contact chamber 8.

The contact chamber 8 preferably comprises a plurality of nozzles 16 for the purpose of atomizing the electrolyte solution 4, wherein, purely for reasons of clarity, branching of the line 5 to the nozzles 16 is not illustrated in any detail.

Moisture is extracted from the drying air by means of the extraction medium 4, that is to say the hygroscopic liquid 4, in the contact chamber 8. The extraction medium 4 heats up during this exothermic process and, in the process, can also heat the drying air in turn.

The drying air together with droplets of the extraction medium enters a separator 14 via the air line 13, it being possible for said separator to firstly likewise be in the form of a contact chamber 14 with a nozzle 15 within the meaning of the invention and/or said separator secondly separating off a separation by means of condensation and/or said separator separating off the solution 4 by means of a wall of a filter or air duct in the form of a separator surface and returning said separation or solution to the container 3 in a manner which is not illustrated in any detail.

In the illustrated exemplary embodiment, the separator 14 is in the form of a sprinkling chamber 14, wherein a sprinkling nozzle 15 sprays the electrolyte solution 4 as rain or relatively large droplets. This rain may form a liquid curtain which washes the finely distributed solution 4 out of the air stream and advantageously additionally dries the air stream.

Very fine droplets of the solution 4 are preferably generated in the contact chamber 8 with a plurality of nozzles 16. That is to say that atomization or fine nebulization of the solution 4 is provided in said contact chamber, and therefore the contact chamber 8 is in the form of a mist chamber 8. A very large active surface is advantageously generated in said chamber by means of extremely fine droplets of the solution 4, this leading to particularly effective and rapid drying of the drying air which is to be dried.

The invention is not restricted to the illustrated exemplary embodiment, in particular the provision of drying according to the invention is not restricted to a circuit as in FIG. 1. In particular, the contact chamber 8 can be designed in any desired manner. Mechanically moving distributor elements and/or nozzles 16 can also be arranged in this chamber 8, for example for distributing the extraction medium 4. The two circuits 1 and 2 represent only one example of a use of a hygroscopic liquid 4 for drying air in a domestic appliance.

LIST OF REFERENCE SYMBOLS

1 Primary circuit
2 Secondary circuit
3 Container
4 Lithium chloride solution
5 Line
6 Pump
7 Heater
8 Contact chamber
9 Liquid
10 Housing
11 Working space
12 Air line
13 Air line
14 Separator
15 Sprinkling nozzle
16 Nozzle
20 Dishes

What is claimed is:

1. A washing apparatus comprising:
(a) a container housing a hydroscopic liquid;
(b) a washing chamber having a drying air inlet and an air outlet;
(c) a contact chamber connected to the drying air inlet of the washing chamber and operatively connected to the container housing the hydroscopic liquid;
(d) at least one nozzle disposed in the contact chamber to spray the hydroscopic liquid in the contact chamber;
(e) a separator chamber disposed downstream from the contact chamber having a nozzle to spray the hydroscopic liquid as a rain or a liquid curtain in the separator chamber to separate additional moisture from an air stream; and
(f) a pump to pump the hydroscopic liquid to the contact chamber.

2. The washing apparatus of claim 1 further comprising a heater disposed between the pump and the contact chamber.

3. The washing apparatus of claim 1 wherein the separator chamber is also disposed between the contact chamber and the drying air inlet of the washing chamber.

4. The washing apparatus of claim 3 wherein the nozzle is a sprinkling nozzle disposed in the separator chamber.

5. The washing apparatus of claim 3 further comprising a fan disposed between the separator chamber and the air inlet of the washing chamber.

6. The washing apparatus of claim 1 further comprising a heater disposed in the container housing the hydroscopic liquid.

7. A washing device having a misting chamber air inlet drier comprising:
(a) a washing chamber having a drying air inlet and a drying air outlet;
(b) a contact chamber connected to the drying air inlet;
(c) a misting chamber connected to the drying air outlet;
(d) a plurality of misting chamber nozzles disposed in the misting chamber;
(e) a reservoir containing a hydroscopic liquid connected to the misting chamber nozzles;
(f) a blower to move air from the washing chamber through the misting chamber; and
(g) a pump to pump the hydroscopic liquid from the reservoir to the misting chamber nozzles.

8. The washing device of claim 7 further comprising a heater disposed in the hydroscopic liquid or between the hydroscopic liquid and the misting chamber.

9. A drying apparatus for a domestic appliance comprising:
(a) a hydroscopic liquid housing;
(b) a washing chamber having an air inlet and an air outlet;
(c) a contact chamber disposed between the air inlet and air outlet of the washing chamber to separate moisture from an air stream in the contact chamber and operatively connected to the hydroscopic liquid housing;
(d) at least one nozzle disposed in the contact chamber to spray a mist or atomized hydroscopic liquid in the contact chamber;
(e) a pump to pump the hydroscopic liquid to the at least one nozzle of the contact chamber;
(f) a separator chamber disposed downstream from the contact chamber having a sprinkling nozzle to spray the hydroscopic liquid as a rain or a liquid curtain in the separator chamber to separate additional moisture from the air stream.

10. The drying apparatus of claim 9 further comprising a heater disposed between the pump and the contact chamber.

11. The drying apparatus of claim 9 further comprising a fan disposed between the separator and the air inlet of the washing chamber.

12. The drying apparatus of claim 9 further comprising a heater disposed in the hydroscopic liquid housing.

13. The drying apparatus of claim 12 further comprising a heater disposed between the pump and the contact chamber.

* * * * *